US012610407B2

(12) United States Patent　　　　　(10) Patent No.:　　US 12,610,407 B2

Tayal et al.　　　　　　　　　　　　(45) Date of Patent:　　Apr. 21, 2026

(54) ANALYZING DEVICE INFORMATION TO PROACTIVELY REQUEST ATTACHMENT TO A NON-STANDALONE ARCHITECTURE NODE WITH MINIMUM SIGNALING ASSOCIATED WITH A TELECOMMUNICATION SIGNAL

(71) Applicant: International Business Machines Corporation, Armonk, NY (US)

(72) Inventors: Sagar Tayal, Ambala City (IN); Sathya Santhar, Ramapuram (IN); Sridevi Kannan, Chennai (IN); Nishant Satish Srivastava, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 17/959,111

(22) Filed: Oct. 3, 2022

(65) Prior Publication Data

US 2024/0114567 A1　　Apr. 4, 2024

(51) Int. Cl.
　　*H04W 76/11*　　　(2018.01)
　　*H04W 84/04*　　　(2009.01)

(52) U.S. Cl.
　　CPC .......... *H04W 76/11* (2018.02); *H04W 84/042* (2013.01)

(58) Field of Classification Search
　　CPC ............................ H04W 76/11; H04W 84/042
　　See application file for complete search history.

(56) References Cited

U.S. PATENT DOCUMENTS

2018/0020418 A1　　1/2018　Chandramouli et al.
2018/0368016 A1　　12/2018　Lee et al.

2019/0215101 A1 *　7/2019　Ko ........................ H04L 1/1819
2020/0389842 A1 *　12/2020　Zhu ....................... H04W 24/02
2021/0014671 A1　　1/2021　Jia et al.
2021/0105591 A1 *　4/2021　Sharma ............... H04M 15/705
2021/0267012 A1 *　8/2021　Huang .................. H04W 80/10

(Continued)

OTHER PUBLICATIONS

Techtarget, "Evolved Packet Core (EPC)," TechTarget, last updated Jan. 2011, 3 pages, retrieved from https://www.techtarget.com/searchnetworking/definition/Evolved-Packet-Core-EPC#:~:text=Evolved%20Packet%20Core%20(EPC)%20is,switched%20(PS)%20for%20data.

(Continued)

*Primary Examiner* — Kiet Tang

(74) *Attorney, Agent, or Firm* — Zilka-Kotab, P.C.

(57)　　　　　　ABSTRACT

A computer-implemented method according to one embodiment includes collecting device information from at least a first device, and receiving, from the first device, a first request to attach to a first base station. In response to receiving the first request, it is determined whether a signal broadcasted from the first base station includes public land mobile network (PLMN) information of a first type of telecommunication signal. In response to a determination that the signal broadcasted from the first base station includes the PLMN information, a second request is sent to a core network to connect the first device to a node associated with the first type of telecommunication signal of the first base station. In response to receiving an indication that the first device is authorized to connect, a connection is allowed to be established between the first device and the node associated with the first type of telecommunication signal.

20 Claims, 10 Drawing Sheets

(56) References Cited

U.S. PATENT DOCUMENTS

| | | | |
|---|---|---|---|
| 2021/0329444 A1* | 10/2021 | Wiemann | ................ H04W 8/24 |
| 2022/0124560 A1 | 4/2022 | Yeh et al. | |
| 2022/0159528 A1 | 5/2022 | Tran et al. | |
| 2024/0056789 A1* | 2/2024 | Karnati | ................ H04W 76/10 |

OTHER PUBLICATIONS

EVENTHELIX, "5G non-standalone access," EventHelix, Sep. 16, 2018, 13 pages, retrieved from https://medium.com/5g-nr/5g-non-standalone-access-4d48cea5db5f.

* cited by examiner

100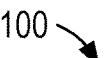

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

INVENTIVE CODE

200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

201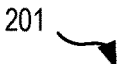

202 — Collect device information from at least a first device

204 — Store the collected device information in a device information list

206 — Cause a random access channel (RACH) process to be performed between the first device and a first base station 208 — Receive, from the first device, a first request to attach to a first base station 210 — Does a signal broadcasted from the first base station includes public land mobile network (PLMN) information of a first type of telecommunication signal No 224 — Allowing a connection to be established between the first device and a node associated with a second type of telecommunication signal Yes To 211

FIG. 2

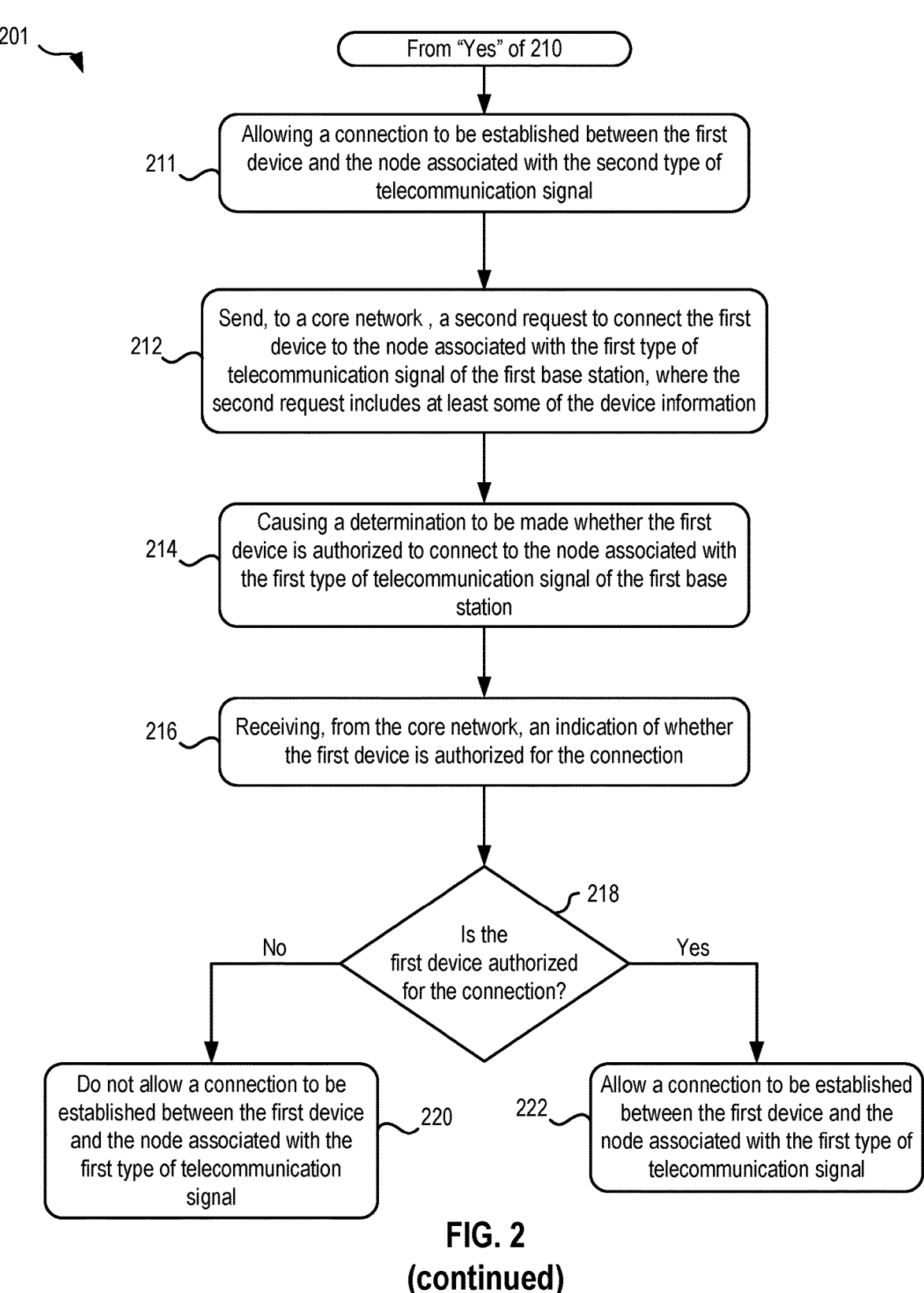

201

From "Yes" of 210

211  Allowing a connection to be established between the first device and the node associated with the second type of telecommunication signal 212  Send, to a core network , a second request to connect the first device to the node associated with the first type of telecommunication signal of the first base station, where the second request includes at least some of the device information 214  Causing a determination to be made whether the first device is authorized to connect to the node associated with the first type of telecommunication signal of the first base station 216  Receiving, from the core network, an indication of whether the first device is authorized for the connection 218  Is the first device authorized for the connection?

No

Yes

220  Do not allow a connection to be established between the first device and the node associated with the first type of telecommunication signal 222  Allow a connection to be established between the first device and the node associated with the first type of telecommunication signal FIG. 2
(continued)

800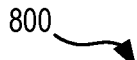

PLMN-InfoList-r15 ::= SEQUENCE (SIZE (1..maxPLMN-r11)) OF PLMN-Info-r15 PLMN-Info-r15 ::= SEQUENCE { upperLayerIndication-r15 ENUMERATED {true} OPTIONAL -- Need OR }

RRCConnectionRequest ::= SEQUENCE { criticalExtensions CHOICE { rrcConnectionRequest-r8 RRCConnectionRequest-r8-IEs, rrcConnectionRequest-r15 RRCConnectionRequest-5GC-r15-IEs SupportedBandListNR-r15 ::= SEQUENCE (SIZE (1..maxBandsNR-r15)) OF SupportedBandNR-r15 SupportedBandNR-r15

| Bit 8 | Bit 7 | Bit 6 | Bit 5 |
|---|---|---|---|
| EEA0 | 128-EEA1 | 128-EEA2 | 128-EEA3 |
| EIA0 | 128-EIE1 | 128-EIA2 | 128-EIA3 |
| UEA0 | UEA1 | UEA2 | UEA3 |
| UCS2 | UIA1 | UIA2 | UIA3 |
| ProSe-dd | ProSe | H.245-ASH | ACC-CSFB |
| ePCO | HC-CP CIoT | Erw/oPDN | S1-U data |
| 15 bearers | SGC | N1mode | DCNR | IMEISV request |

Extended APN-AMBR                                    Extended APN aggregate maximum bit rate

FIG. 8D

840

RRCConnectionSetup ::=SEQUENCE { rrc-TransactionIdentifier RRC-TransactionIdentifier, criticalExtensions CHOICE { c1 CHOICE { rrcConnectionSetup-r8RRCConnectionSetup-r8-IEs

FIG. 8E

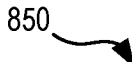
850

SupportedBandListNR-r15 ::= SEQUENCE (SIZE (1..maxBandsNR-r15)) OF SupportedBandNR-r15 SupportedBandNR-r15 ::= SEQUENCE { bandNR-r15 FreqBandIndicatorNR-r15 } FreqBandIndicatorNR-r15 ::= INTEGER (1.. maxFBI-NR-r15)

FIG. 8F

860

RRCConnectionSetupComplete-v1020-IEs ::= SEQUENCE { gummei-Type-r10 ENUMERATED {native, mapped} OPTIONAL, rlf-InfoAvailable-r10 ENUMERATED {true} OPTIONAL, logMeasAvailable-r10 ENUMERATED {true} OPTIONAL, rn-SubframeConfigReq-r10 ENUMERATED {required, notRequired} OPTIONAL, nonCriticalExtension RRCConnectionSetupComplete-v1130-IEs OPTIONAL

FIG. 8G

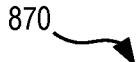
870

FreqBandIndicatorNR-r15 ::= INTEGER (1.. maxFBI-NR-r15)

FIG. 8H

ANALYZING DEVICE INFORMATION TO PROACTIVELY REQUEST ATTACHMENT TO A NON-STANDALONE ARCHITECTURE NODE WITH MINIMUM SIGNALING ASSOCIATED WITH A TELECOMMUNICATION SIGNAL

BACKGROUND

The present invention relates to telecommunication signals, and more specifically, this invention relates to analyzing device information at a base station from initial attach messages exchanged between a device and a base station. This analysis is used for proactively determining device capability, whether a device should piggyback an information element to a request, and whether the device should be allowed to be connected to a non-standalone node associated with a telecommunication signal of a base station. Such analysis reduces an attach time to a non-standalone network.

Communication devices, e.g., tablets, cellular phones, computers, etc., are often enabled to perform input/output (I/O) operations, e.g., download, upload, etc., based on being connected to a node associated with a telecommunication signal, e.g., third-generation wireless (3G), fourth-generation wireless (4G), fifth-generation wireless (5G), Long-Term Evolution (LTE), etc., of a communication network. A given communication device may connect to one or more nodes associated with one or more telecommunication access technology signals in accordance with one or more parameters, e.g., such as a current geographical proximity of the communication device with respect to the base stations that each transmit at least one telecommunication signal, current configuration(s) of the communication device, service plans that a user of the communication device subscribes to, etc. Subsequent the given communication device connecting to a node associated with a first telecommunication signal, the communication device may terminate the connection to the node associated with the first telecommunication signal in the process of and/or subsequent to connecting to a node associated with a second telecommunication signal. For example, a communication device may connect to a node associated with a first telecommunication signal of a first base station while at a first geographical location, but thereafter terminate the connection to the node associated with the first telecommunication signal in response to entering into a second geographical location. Upon entering into the second geographical location, the communication device may connect to the node associated with the the second telecommunication signal of a second base station.

SUMMARY

A computer-implemented method according to one embodiment includes collecting device information from at least a first device, and receiving, from the first device, a first request to attach to a first base station. In response to receiving the first request, it is determined whether a signal broadcasted from the first base station includes public land mobile network (PLMN) information of a first type of telecommunication signal. The method further includes, in response to a determination that the signal broadcasted from the first base station includes the PLMN information, sending, to a core network, a second request to connect the first device to a node associated with the first type of telecommunication signal of the first base station. The second request includes at least some of the device information. In response to receiving, from the core network, an indication that the first device is authorized for the connection, a connection is allowed to be established between the first device and the node associated with the first type of telecommunication signal.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 2 is a flowchart of a method, in accordance with one embodiment of the present invention.

FIG. 8A is a depiction of an information element, in accordance with one embodiment of the present invention.

FIG. 8B is a depiction of an information element, in accordance with one embodiment of the present invention.

FIG. 8C is a table of information elements, in accordance with one embodiment of the present invention.

FIG. 8D is a depiction of information elements, in accordance with one embodiment of the present invention.

FIG. 8E is a depiction of information elements, in accordance with one embodiment of the present invention.

FIG. 8F is a depiction of information elements, in accordance with one embodiment of the present invention.

FIG. 8G is information elements, in accordance with one embodiment of the present invention.

FIG. 8H is a depiction of information elements, in accordance with one embodiment of the present invention.

DETAILED DESCRIPTION

Figures 3, 4:
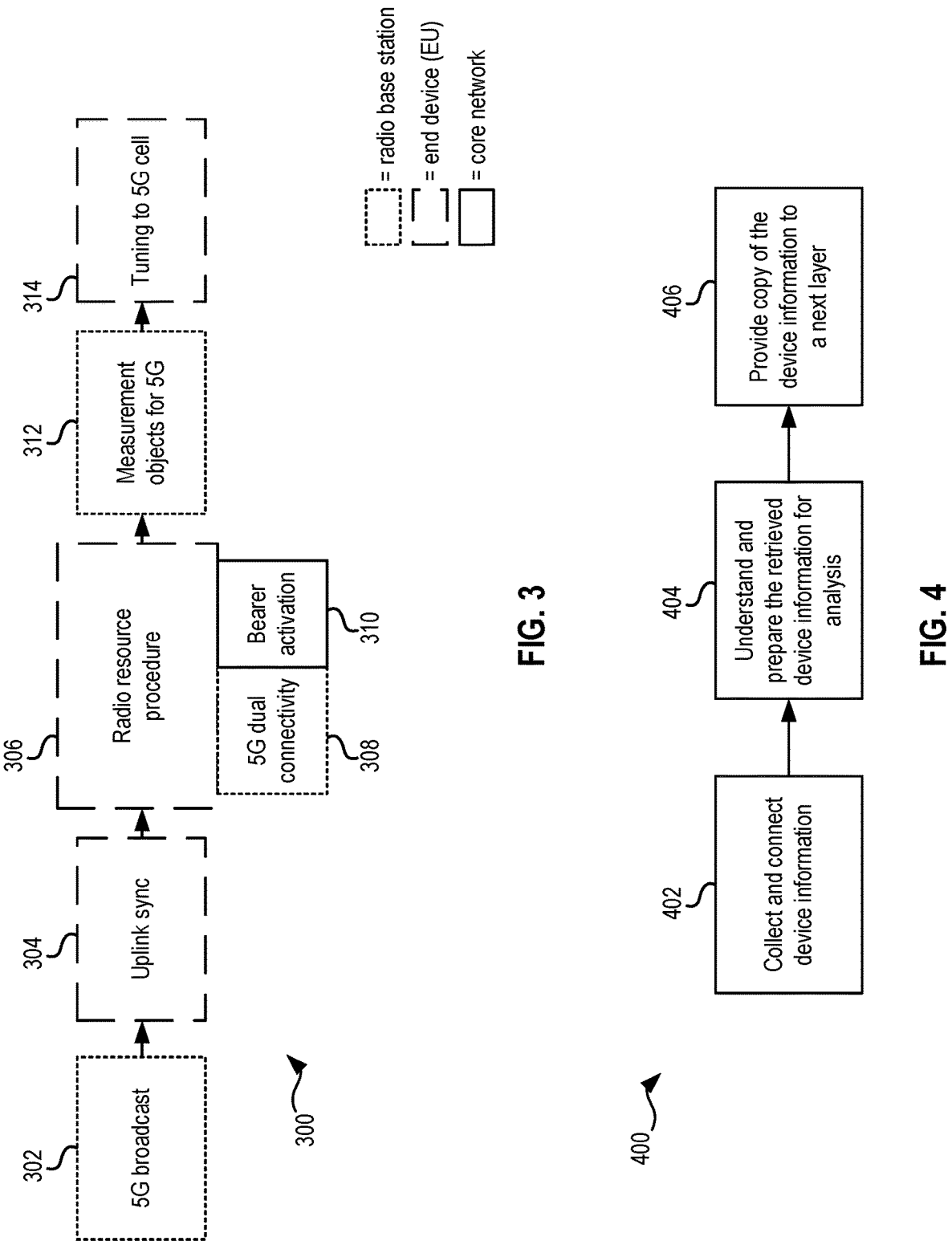
FIG. 3 is a flowchart that illustrates of a progression of a 5G non-standalone architecture (NSA) process of a device connecting to a node associated with a 5G telecommunication signal, in accordance with one embodiment of the present invention.
FIG. 4 is a flowchart of a process for collecting, sorting and using device information, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for attaching device information to an attach request sent to a core network for determining whether to allow a device to be connected to a node associated with a telecommunication signal of a base station.

In one general embodiment, a computer-implemented method includes collecting device information from at least a first device, and receiving, from the first device, a first request to attach to a first base station. In response to receiving the first request, it is determined whether a signal broadcasted from the first base station includes public land mobile network (PLMN) information of a first type of telecommunication signal. The method further includes, in response to a determination that the signal broadcasted from the first base station includes the PLMN information, sending, to a core network, a second request to connect the first device to a node associated with the first type of telecommunication signal of the first base station. The second request includes at least some of the device information. In response to receiving, from the core network, an indication that the first device is authorized for the connection, a connection is allowed to be established between the first device and the node associated with the first type of telecommunication signal.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as inventive code of block 200 for attaching device information to an attach request sent to a core network for determining whether to allow a device to be connected to a node associated with a telecommunication signal of a base station. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere herein, communication devices, e.g., tablets, cellular phones, computers, etc., are often enabled to perform input/output (I/O) operations, e.g., download, upload, etc., based on being connected to a node associated with a telecommunication signal, e.g., third-generation wireless (3G), fourth-generation wireless (4G), fifth-generation wireless (5G), Long-Term Evolution (LTE), etc., of a communication network. A given communication device may connect to one or more nodes associated with one or more telecommunication access technology signals in accordance with one or more parameters, e.g., such as a current geographical proximity of the communication device with respect to the base stations that each transmit at least one telecommunication signal, current configuration(s) of the communication device, service plans that a user of the communication device subscribes to, etc. Subsequent the given communication device connecting to a node associated with a first telecommunication signal, the communication device may terminate the connection to the node associated with the first telecommunication signal in the process of and/or subsequent to connecting to a node associated with a second telecommunication signal. For example, a communication device may connect to a node associated with a LTE telecommunication signal of a first base station while at a first geographical location, but thereafter terminate the connection to the node associated with the first telecommunication signal in response to entering into a second geographical location that includes a second base station transmitting a 5G+LTE signal. Upon entering into the second geographical location, the communication device may connect to the 5G+LTE signal.

In some approaches the process of a communication device connecting to a node associated with a telecommunication signal of a base station may be referred to as an "attach procedure." For mobile network operators (MNOs) that are looking to deliver mainly high-speed connectivity to consumers with 5G-enabled devices, a non-standalone architecture (NSA) is sometimes used. For context, in the NSA mode, a device may be connected to more than one communication signal, e.g., such as LTE and 5G, for performing downloads, but for a control pane, e.g., for signaling, the device may only be connected to a communication signal having relatively lesser capabilities, e.g., LTE in the current example, for purposes of signaling. Note that in such a configuration, a framework that includes the different communication signals may be an Evolved Packet Core (EPC) which may be a framework that provides converged voice and data on a 4G LTE network. The NSA is useful in such a case in that it enables such MNOs to leverage their existing network investments in mobile core rather than deploying a completely new end to end network of telecommunication signals, e.g., such as 5G.

In a 5G NSA mode, an end device may need to perform an attach procedure with an LTE radio and then connect with a 5G radio for a leg addition. This overall process leads to a relatively significant amount of signaling on a radio interface, and thus a relatively high signaling load and delay is incurred. This incurrence of load and delay is problematic in some respects. For example, because 5G NSA is still in an initial deployment phase, 5G coverage may be patchy and thus a relatively extensive amount of of reiteration of network attach with a 5G leg may be needed. This leads to relatively higher access time leads, which in turn results in poor service perception among users. There is no smart mechanism currently available and/or deployed that proactively gauges device and network capabilities in order to streamline device connection and/or disconnection between different communication signals. In sharp contrast to the deficiencies of various conventional techniques described above, various embodiments and approaches described herein include collecting device information, creating a device twin and thus proactively synchronizing a radio access network (RAN). Furthermore, the novel techniques of the various embodiments and approaches described herein enable a device and core network for relatively fast connectivity and reduced signaling transition among communication links between two or more communication stations, e.g., air interfaces.

Now referring to FIG. 2, a flowchart of a method 201 is shown according to one embodiment. The method 201 may be performed in accordance with the present invention in any of the environments depicted in FIGS. 1-8H, among others, in various embodiments. Of course, more or fewer operations than those specifically described in FIG. 2 may be included in method 201, as would be understood by one of skill in the art upon reading the present descriptions.

Each of the steps of the method 201 may be performed by any suitable component of the operating environment. For example, in various embodiments, the method 201 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 201. Illustrative processors include, but are not limited to, a central processing unit (CPU), an application specific integrated circuit (ASIC), a field programmable gate array (FPGA), etc., combinations thereof, or any other suitable computing device known in the art.

Operation 202 includes collecting device information from at least a first device. The first device may in some preferred approaches be a communication device that is configured to be connected to, e.g., tuned to, one or more communication signals of one or more base stations. For example, the first device may be, e.g., a tablet, a cellular phone, a computer, etc. In some approaches the device information may include system information block type 2 (SIB2), e.g., that is being broadcasted by a device such as the first device. The device information may additionally and/or alternatively include Dual-Connectivity with New Radio (DCNR) bit information, e.g., such as DCNR restricted status which may indicate that the first device cannot connect to a node associated with a first telecommunication signal without a second telecommunication signal and/or network being also present. The device information may in some other approaches additionally and/or alternatively include masked international mobile station equipment identity software version (IMEISV) information, masked international mobile station equipment identity (IMEI) information, and/or the software version information such as the software version on which the device is running, e.g., such as the code that identifies the first device such as a mobile phone and/or a version of software that the first device is running, etc. According to several other approaches, the device information may include at least some user equipment (UE)-NR-capabilities, e.g., pdcp-Parameters, rlc-Parameters, mac-Parameters, phy-Parameters, rf-Parameters, measAndMobParameters, fr1-Add-UE-NR-Capabilities, fr2-Add-UE-NR-Capabilities, featureSets, etc., where "UE" may represent the first device. According to several other approaches, the device information may additionally and/or alternatively include at least some UE-EUTRA-capabilities, e.g., accessStratumRelease re115, ue-Category, pdcp-Parameters, phyLayerParameters, rf-Parameters, measParameters, featureGroupIndicators, etc.

In some approaches a predetermined programmable analytic engine may be used to, e.g., request the device information, collect the device information, store the device information, etc. As new IOT and/or smart devices are continuously launched in a predetermined market space, the predetermined programmable analytic engine is in some approaches configured to update a repository of device information as one time activity. The predetermined programmable analytic engine may be of a type that would become appreciated by one of ordinary skill in the art upon reading various descriptions herein. In some approaches, a query may be issued, e.g., by the predetermined programmable analytic engine to the first device, to collect such device information. In another approach, the device information may be requested from the first device in response to receiving, from the first device, a request for connecting to a node associated with a telecommunication signal, e.g., a node of a base station that transmits the telecommunication signal. In some other approaches, the device information may be broadcasted by the first device. In one or more of such approaches, the information may be collected from the broadcast. The collected device information may be stored in a device information list in some approaches, e.g., see operation 204. The device information list may be a known type of list. In some approaches the device information list may be encrypted, e.g., to protect the device information. The device information may in some approaches be bucketized before adding the device information to the device information list. For example, known techniques for IMEISV based capability collection may be used for bucketizing the device information. In another approach, known types of parameters of the device information may be normalized and bucketized in the process of storing the device information to the device information list. Such bucketizing may be performed to understand and prepare the retrieved device information for analysis which will be described in greater detail elsewhere, e.g., see operation 212 in which the device information is used.

For context, the first device may in some approaches not be connected to any nodes associated with telecommunication signals upon method 201 being initiated. For context, it may be noted that a node may be associated with a telecommunication signal based on the node being of the base station, where the node is a potential connection point of the base station at which a device may tune to the telecommunication signal. In contrast, in some other approaches, the first device may in some approaches be connected to at least one node associated with a telecommunication signal that is transmitted by at least one base station of a network upon method 201 being initiated. The first base station may be configured to transmit one or more telecommunication signals, e.g., a fifth-generation wireless (5G) signal, a Long-Term Evolution (LTE) signal, a fourth-generation wireless (4G) signal, a third-generation wireless (3G) signal, etc. In one preferred approach the first base station may include an LTE node, e.g., LTE eNodeb (master node (MN)-enB) with Programmable Analytics Engine (PAE), and a 5G node, e.g., 5G gNodeB (secondary node (SN)-gNB). The first base station may broadcast one or more of the telecommunication signals, e.g., ongoingly, periodically, once, etc. For example, in one approach, the first base station may transmit a first type of telecommunication signal that is a SIB2 broadcast from MN-eNB that signals a presence of 5G-NR PLMNs via the PLMN-InfoList-r15. In some approaches, in response to detecting, e.g., by the first device, the broadcast of first type of telecommunication signal, the first device may attempt to connect to the node associated with the telecommunication signal, e.g., see various of the operations of method 201 described below. The first type of telecommunication signal may be any type of telecommunication signal, and the type may depend on the approach.

Operation 206 includes causing a random access channel (RACH) process to be performed between the first device and a master node of the first base station. The master node may be associated with the first type of telecommunication signal that is transmitted by the first base station. More specifically, in one approach, the Random access Channel (RACH) process may be performed between the first device and an LTE leg, e.g., LTE eNodeb (master node (MN)-enB), of the first base station in an approach in which the first base station transmits both an LTE telecommunication signal and a 5G telecommunication signal.

Subsequent to the RACH process being performed, an attempt may be made to connect the first device to the node associated with the telecommunication signal of the first base station. For example, operation 208 includes receiving, from the first device, a request to attach to at least one node associated with a telecommunication signal of the first base station, e.g., hereafter referred to as a "first request." The first request may be a radio resource control (RRC) connection request. In one approach the first device may send the first request in an attempt to connect to at least one signal of the first base station. For example, assuming the first base station transmits a first type of telecommunication signal that is a 5G telecommunication signal, the first request may be a request to connect to the node associated with the first type of telecommunication signal. However, it should be noted that the first base station may also transmit a second type of telecommunication signal, e.g., such as an LTE telecommunication signal, and therefore the first request may additionally and/or alternatively be a request to connect to a node associated with the second type of telecommunication signal.

It may be noted that the first request may be received while the first device is connected to a node associated with a second type of telecommunication signal of a second base station. In some approaches, an attempt may be performed to connect the first device to the first base station despite the first device at some point being connected to the node associated with the second type of telecommunication signal of a second base station, in response to a determination that the first device has exited a predetermined geographical proximity of the second base station, and entered into a predetermined geographical proximity of the first base station. More specifically, upon entering into a predetermined geographical proximity of the first base station, one or more telecommunication signals of the first base may offer a relatively stronger signal and/or a relatively superior signal quality with minimal interference than one or more telecommunication signals of the second base station. In another approach, an attempt may be performed to connect the first device to the first base station despite the first device at some point being connected to the node associated with the second type of telecommunication signal of a second base station, in response to a determination that a predetermined error event has occurred on the second base station, e.g., a disaster event, a predetermined amount of interference being experienced by the first device, etc. In one illustrative approach, the first type of telecommunication signal of the first device may be 5G and the second type of telecommunication signal of the second device may be an LTE signal, e.g., 4G. In some approaches, the first base station may additionally and/or alternatively transmits a third type of telecommunication signal that is LTE. According the first request may be a request for connecting to a node associated with the LTE and/or 5G telecommunication signals of the first base station.

In response to receiving the first request, it may be determined whether a signal broadcasted from the first base station, e.g., of a SIB2 broadcast, includes public land mobile network (PLMN) information of a first type of telecommunication signal, e.g., see decision 210. The PLMN identifier may be used to identify the radio networks in use. The identifier may be made up of mobile country code (MCC) and mobile network code (MNC) where MCC. MCC is used in wireless telephone networks such as GSM, CDMA, WCDMA, LTE, 5G, etc., in order to identify a country that a mobile user belongs to. MCC consists of three decimal digits. MNC is also used in wireless telephone networks in order to identify a mobile network that the mobile user belongs to. MNC includes two or three decimal digits. According to a more specific approach, such a determination may be made to determine whether the signal broadcasted from the first base station includes PLMN information of a 5G telecommunication signal. Techniques for determining whether the signal broadcasted from the first base station includes the PLMN information that would become appreciated by one of ordinary skill in the art upon reading various of the descriptions herein may be utilized for performing decision 210. In response to a determination that the signal broadcasted from the first base station does not include the PLMN information of the first type of telecommunication signal, e.g., as illustrated by the "No" logical path of decision 210, the first request may optionally be treated as a request for attaching to a node associated with another type of telecommunication signal of the first base station. For example, assuming that the signal broadcasted from the first base station does not include the PLMN information of a 5G telecommunication signal and that the first base station transmits a second type of telecommunication signal that is a LTE telecommunication signal, a connection may be allowed to be established between the first device and a node associated with a second type of telecommunication signal of the first base station, e.g., see operation 224. In contrast, in some preferred approaches, in response to a determination that the signal broadcasted from the first base station includes the PLMN information of the first type of telecommunication signal, e.g., 5G PLMN is present in SIB2 and as illustrated by the "Yes" logical path of decision 210, a connection may be allowed to be established between the first device and the node associated with the second type of telecommunication signal, e.g., see operation 211. For example, assuming that the first base station transmits both LTE and 5G telecommunication signals, the first device may be allowed to perform, e.g., instructed to initiate, a RRC connection with the LTE leg of the first base station. Furthermore, assuming that the first device has NSA capabilities, e.g., may be connected to the node associated with the second type of telecommunication signal of the first base station and a node associated with a first type of telecommunication signal of the first base station, an attach request is preferably piggybacked towards another leg of the first base station, e.g., a 5G leg. In one specific approach, the second request may be sent via a non-access stratum (NAS) signaling message from a master node of the first base station to the core network via a packet data network (PDN) connection request, e.g., the first request. In response to a determination that the signal broadcasted from the first base station includes the PLMN information of the first type of telecommunication signal and/or in response to a determination that the first device has NSA capabilities, a request to connect the first device to the node associated with the first type of telecommunication signal of the first base station, e.g., hereafter referred to as a "second request," may be sent to a core network, e.g., see operation 212. The core network may be of a known type, and may be in communication with one or more devices and/or one or more base stations, e.g., the first base station, the first device, a second device, a second base station, etc. In some approaches operation 212 includes issuing an instruction to cause the second request to be sent from the master node of the first base station to the core network.

The second request preferably includes at least some of the device information, e.g., see device information collected and stored in operations 202-204. The second request may in some approaches be immediately sent to the core network, e.g., subsequent to attachments of the device information, and the device information being attached to the second request may indicate an intention of the first device to latch to the node associated with the second type of telecommunication signal of the first base station. In one preferred approach, the device information attached to the second request includes DCNR bit information of capabilities of the first device, e.g., such as DCNR restricted status which may indicate that the first device cannot connect to a node associated with a 5G telecommunication signal without a 4G telecommunication signal and/or 4G network being also present. In another preferred approach, the device information attached to the second request includes IMEISV information. For context, IMEISV information may be code that identifies information about the first device, e.g., the first device as being a mobile phone, a version of software that the first device is running, etc. It should be noted that attaching device information to a second request is not performed in conventional telecommunication signal environments. Instead, capability enquiries are otherwise performed in independent operations with causes configuration and connection delays that are unsatisfactory to customers. Accordingly, attaching device information to such a second request streamlines the process of determining whether a connection should be allowed to be established between a device and a node associated with a telecommunication signal, e.g., see operation 214. This eliminates processing operations that would otherwise be performed by resources of computer devices of a core network, and thereby improves computational efficiencies the core network. Accordingly, the inventive discoveries disclosed herein with regards to use of attaching device information to attach requests in telecommunication signal environments proceed contrary to conventional wisdom.

It should be noted that in some approaches the "second request" is in fact the first request that is relayed from the master node of the first base station to the core network subsequent to the at least some device information being added to the first request at the master node of the first base station. In other words, in one or more of such approaches the first request becomes the second request upon the at least some device information being added, piggybacked, to the first request. For example, the first request may be an RRC connection request, and the second request may be the RRC connection requestion with device information attached thereto, e.g., attached DCNR and/or IMEISV information. In contrast, in some other approaches, the second request may be an attach request that is independently generated with the attached device information for sending to the core network.

The core network preferably performs a check to determine whether the first device is authorized to connect to networks such as the first base station that transmit more than one type of telecommunication signal, e.g., a 4G and 5G network. Accordingly, in some approaches, method 201 includes causing a determination to be made whether the first device is authorized to connect to the node associated with the first type of telecommunication signal of the first base station, e.g., see operation 214. The determination of operation is in some preferred approaches based on the at least some of the device information included in the second request. In some approaches causing the determination to be made whether the first device is authorized to connect to the node associated with the first type of telecommunication signal of the first base station may include instructing the core network to determine, using the device information attached to the second request, whether the first device is configured to connect to the node associated with the first telecommunication signal, e.g., is configured to connect to a node associated with an LTE plus 5G telecommunication signal of a base station. In some approaches, such a determination may be based on a determination of whether or not the device information included in the second request specifies that the first device has NSA capabilities, e.g., is able to be connected to a node associated with an LTE telecommunication signal and another node associated with a 5G telecommunication signal of the first base station. For example, in response to a determination that the device information specifies that the first device includes NSA capabilities, it may be determined that the first device is authorized to connect to the node associated with the first type of telecommunication signal of the first base station. In contrast, in response to a determination that the device information specifies that the first device does not include NSA capabilities, it may be determined that the first device is not authorized to connect to the node associated with the first type of telecommunication signal of the first base station. In another approach, the determination may be based on accessing a predetermined list that specifies devices that are authorized to connect to one or more nodes associated with one or more telecommunication signals of the first base station. In yet another approach, the determination may be based on whether or not the first device is already and/or successfully connected to the node associated with the second telecommunication signal of the first base station.

Operation 216 includes receiving, from the core network, an indication of whether the first device is authorized for the connection. In some approaches the indication may be included in a response from the core network to the master node of the first base station, e.g., eNodeB responds with a RRC setup message on a downlink shared channel (DL-SCH). In some approaches the indicated may be returned to the master node as an initial context setup request [Attach Accept] [Activate Default Bearer Request {APN-AMBR IE}]. Accordingly, in one or more of such approaches, operation 216 may include accessing and/or intercepting the response and determining what the indication specifies. The indication of whether the first device is authorized for the connection may additionally and/or alternatively be transmitted from the master node to the first device, e.g., using the second telecommunication signal to transmit a RRC connection setup request on a DL-SCH. For example, in some approaches in which an LTE leg of the first base station has an attach accept message from the core network, the LTE leg may send a RRC connection setup message to the first device. A confirmation that RRC connection setup is complete may optionally be returned from the first device to the mast node of the first base station. However, it should be noted that in approaches in which the master node already has the first device capabilities such as band support for the type allocation code (TAC) from the IMEISV, no first device capability request is needed to be sent to first device. Instead, this information is already known from the device information, and processing that would otherwise be performed to determine such information is preserved.

Connection of the first device to one or more nodes associated with telecommunication signals of the first base station depends on whether it is indicated that the first device is authorized for the connection, e.g., see decision 218. In response to receiving, from the core network, an indication that the first device is not authorized for the connection, e.g., as illustrated by the "No" logical path of decision 218 representing that the first device is not authorized to be connected to the node associated with the first type of telecommunication signal, a connection is not allowed to be established between the first device and the node associated with the first type of telecommunication signal, e.g., see operation 220. In contrast, it may be determined that the first device is authorized to be connected to the node associated with the first type of telecommunication signal. For example, in response to receiving, from the core network, an indication that the first device is authorized for the connection, e.g., as illustrated by the "Yes" logical path of decision 218, a connection is allowed to be established between the first device and the node associated with the first type of telecommunication signal, e.g., see operation 222. An illustrative process for activating NR-DC dual 5G connectivity at the core network is described below.

In some approaches, because the masked IMEISV information which has the type allocation code (TAC) information is known a repository of the master node may fetch the first device type related information at this point. It should be noted that a leg of the first base station that transmits the first telecommunication signal does not need to enquire various types of device information in order to establish the connection between the first device and the node associated with the first telecommunication signal of the first base station as is otherwise performed in conventional techniques. Accordingly, the indication is not determined and the connection is not established based on a capability enquiry from the master node of the first base station to the first device. Furthermore, the indication is not determined and the connection is not established based on an answer to the capability enquiry from the first device to the master node of the first base station. In some approaches in which this is enabled, as based on the TAC code, such capabilities and band support are readily available. Accordingly, the RRC reconfiguration message may be directly shared with a band combination for the first telecommunication signal to be searched and accessed by the first device in the process of establishing the connection. In some approaches, allowing the connection to be established between the first device and the node associated with the first type of telecommunication signal may additionally and/or alternatively include initiating and/or allowing a RRC connection reconfiguration to occur between the master node of the first base station and the first device. For example, an RRC connection reconfiguration request may be sent from the master node of the first base station to the first device, e.g., ([Attach Accept] [Activate Default Bearer Request]. In some approaches, the first device may acknowledge the request by sending a RRC reconfiguration complete message to the master node, e.g., RRC connection reconfiguration complete, and the first device may be instructed to begin searching for a leg of the first type of telecommunication signal. Allowing the connection to be established between the first device and the node associated with the first type of telecommunication signal may additionally and/or alternatively include instructing the first device to tune to the first type of telecommunication signal of a secondary node, e.g., 5G gNodeB (SN-gNB), of the first base station.

Now referring to FIG. 3, a flowchart of a method 300 is shown according to one embodiment. The method 300 may be performed in accordance with the present invention in any of the environments depicted in FIGS. 1-8H, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s)

implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

The flowchart of method 300 illustrates a progression of a 5G NSA process of a device, e.g., see end device (EU), connecting to a node associated with a 5G telecommunication signal, in accordance with one embodiment. It should be noted that although method 300 is performed with respect to connecting to a node associated with a 5G telecommunication signal, in some other approaches the method may additionally and/or alternatively be performed with respect to a node associated with an LTE telecommunication signal, a node associated with a 6G telecommunication signal, a node associated with a 3G telecommunication signal, etc. In operation 302, a 5G telecommunication signal broadcast is performed by a first base station. This broadcast indicates to devices that the base station, e.g., see radio base station, has a 5G telecommunication signal that is available to tune to. In operation 304, an uplink synchronization, e.g., see uplink sync, is performed between a first device that is attempting to connect to a node associated with the 5G telecommunication signal. The uplink sync operation essentially initiates the process of the device attempting to connect to the node associated with the legacy/4G telecommunication signal of the base station. In operation 306, a radio resource procedure is performed in which it may be concurrently determined whether the first device is configured for dual connectivity, e.g., to connect to a node associated with an LTE signal of the base station and a interface associated with the 5G telecommunication signal of the base station, e.g., see operation 308, and whether the first device supports 5G NSA of the base station. Assuming that such capabilities are supported, in parallel, a request with information about the first device is output to a core network to determine whether the first device is authorized to connect to the node associated with the 5G telecommunication signal of the base station, e.g., see bearer activation operation 310. Note that operation 308 and 310 may be performed in parallel. The core network may activate the bearers for the connection between the node associated with the 5G telecommunication signal and the first device provided that the first device is authorized to connect to the node associated with the 5G telecommunication signal. Provided that the first device is determined to be authorized to connect to the node associated with the 5G telecommunication signal, an RRC connection reconfiguration process is performed and the first device tunes to the 5G telecommunication signal, e.g., see operations 312-314.

Now referring to FIG. 4, a flowchart of an illustrative process 400 for collecting device information is shown according to one embodiment. The process 400 may be performed in accordance with the present invention in any of the environments depicted in FIGS. 1-8H, among others, in various embodiments. Of course, more or fewer operations than those specifically described in FIG. 4 may be included in process 400, as would be understood by one of skill in the art upon reading the present descriptions.

Each of the steps of the process 400 may be performed by any suitable component of the operating environment. For example, in various embodiments, the process 400 may be partially or entirely performed by a computer, or some other device having one or more processors therein. The processor, e.g., processing circuit(s), chip(s), and/or module(s)

implemented in hardware and/or software, and preferably having at least one hardware component may be utilized in any device to perform one or more steps of the process 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 of process 400 includes collecting and connecting device information, e.g., access data of a device. Techniques for collecting device information described elsewhere herein may be used to collect and connect the device information, e.g., see operation 302 of method 300. Operation 404 includes bucketing the device information in order to understand and prepare the device information, e.g., retrieve data, for analysis, such as to analyze whether the device is configured to connect to a node associated with a 5G telecommunication signal. Operation 406 includes providing a copy of the device information to a next layer, e.g., attaching a copy of at least some of the device information to a request sent from Programmable Analytics layer (PAE) to a Base Station.

Figure 5:
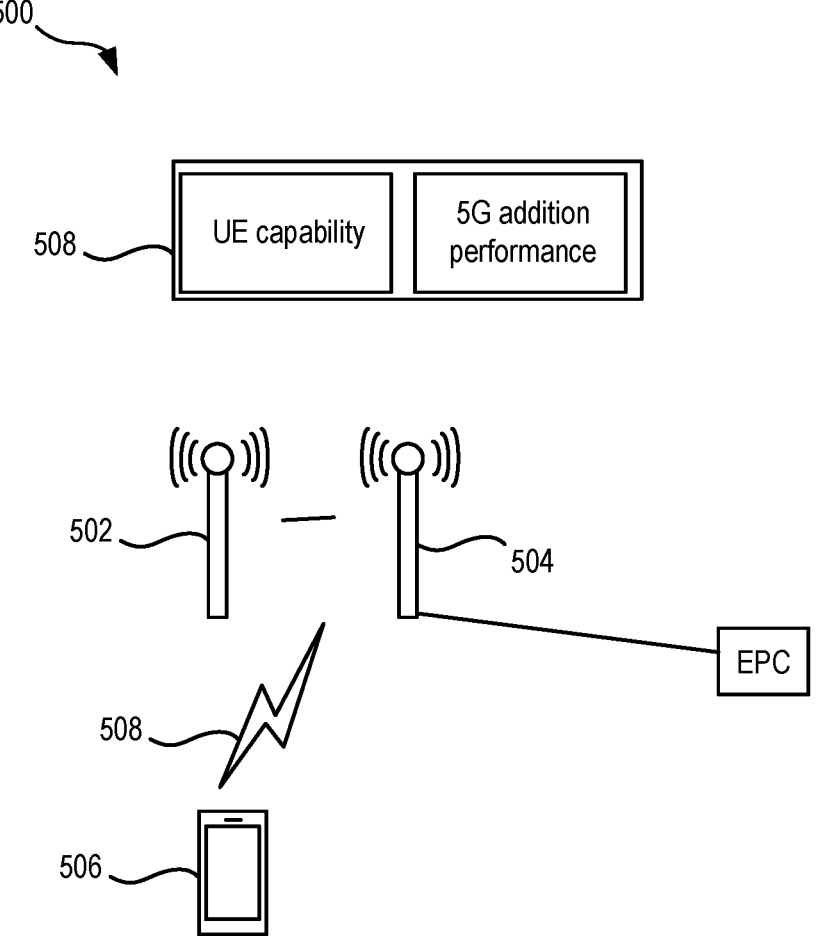
FIG. 5 is an architecture, in accordance with one embodiment of the present invention.

FIG. 5 depicts an architecture 500, in accordance with one embodiment. As an option, the present architecture 500 may be implemented in conjunction with features from any other embodiment listed herein, such as those described with reference to the other FIGS. Of course, however, such architecture 500 and others presented herein may be used in various applications and/or in permutations which may or may not be specifically described in the illustrative embodiments listed herein. Further, the architecture 500 presented herein may be used in any desired environment.

The architecture 500 includes a 5G base station 502 and an LTE base station 504. A device 506 that has a 5G NSA supported terminal may be connected to a node associated with an LTE telecommunication signal of the LTE base station 504, e.g., see connection 508, and attempt to connect to a node associated with a 5G telecommunication signal of the 5G base station 502. A predetermined programmable analytic layer may be used to collect device information from the device 506, e.g., see UE capability and 5G addition performance which is device information that may be used to determine that the device 506 is configured to connect to the node associated with the 5G telecommunication signal. Such information may be attached to a request to a core network that is in communication with the base station 502 and/or the base station 504, to determine if the device is authorized to connect to the node associated with the 5G telecommunication signal of the 5G base station 502.

Figure 6:
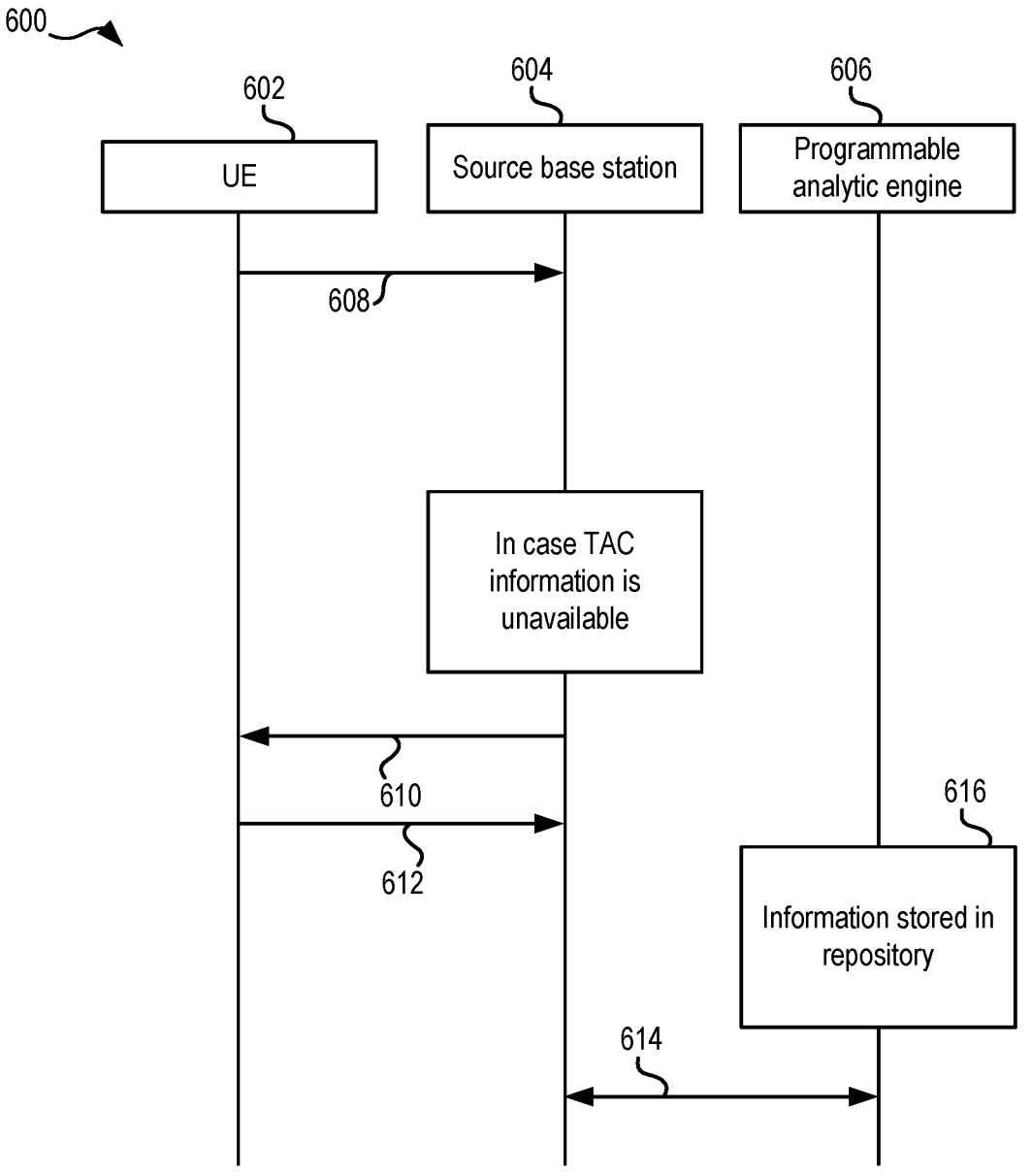
FIG. 6 is a flowchart of a method, in accordance with one embodiment of the present invention.

Now referring to FIG. 6, a flowchart of a method 600 is shown according to one embodiment. The method 600 may be performed in accordance with the present invention in any of the environments depicted in FIGS. 1-8H, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, each of the nodes 602, 604, 606 shown in the flowchart of method 600 may correspond to one or more processors positioned at a different location in a network environment. Moreover, each of the one or more processors are preferably configured to communicate with each other.

In various embodiments, the method 600 may be partially or entirely performed by a controller, a processor, etc., or some other device having one or more processors therein.

The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 6 includes different nodes 602, 604, 606, each of which represent one or more processors, controllers, computer, etc., positioned at a different location in a network. For instance, node 602 may include a first device, e.g., see user equipment (UE). Node 604 may include a second device, e.g., see source base station. Furthermore, node 606 may include a program, e.g., see programmable analytics engine, of a third device that is in communication with the one or more processors at each of nodes 602 and 604. Accordingly, commands, data, requests, etc. may be sent between each of the nodes 602, 604, 606 depending on the approach. Moreover, it should be noted that the various processes included in method 600 are in no way intended to be limiting, e.g., as would be appreciated by one skilled in the art after reading the present description. For instance, data sent from node 602 to node 604 may be prefaced by a request sent from node 604 to node 602 in some approaches.

It may be prefaced that method 600 may be a process for upgrading and/or performing maintenance on capabilities of a base station. In operation 608 an RRC connection request is output from the UE and thereafter received by the source base station. In some approaches the RRC connection request may be a NAS attach request and/or include device information such as UE network capabilities, e.g., IMEISV DC may be sent. It should be noted that in the event that it is determined that TAC information is unavailable, a UE capability request may be performed, e.g., see operation 610, and a UE capability response may be returned, e.g., see operation 612. Assuming that such information is provided and thereby available using various techniques described elsewhere herein, e.g., see method 201, the information received at the device information is stored in a repository, e.g., see operation 616. In one approach, the device information may be stored with the programmable analytics engine to update a repository on an X2 link, e.g., see operation 614. It should be noted that as new IOT/smart devices are launched in the market space, various techniques of method 600 may optionally be performed to update the repository, e.g., as a one time activity in response to one or more devices being launched.

Figure 7A:
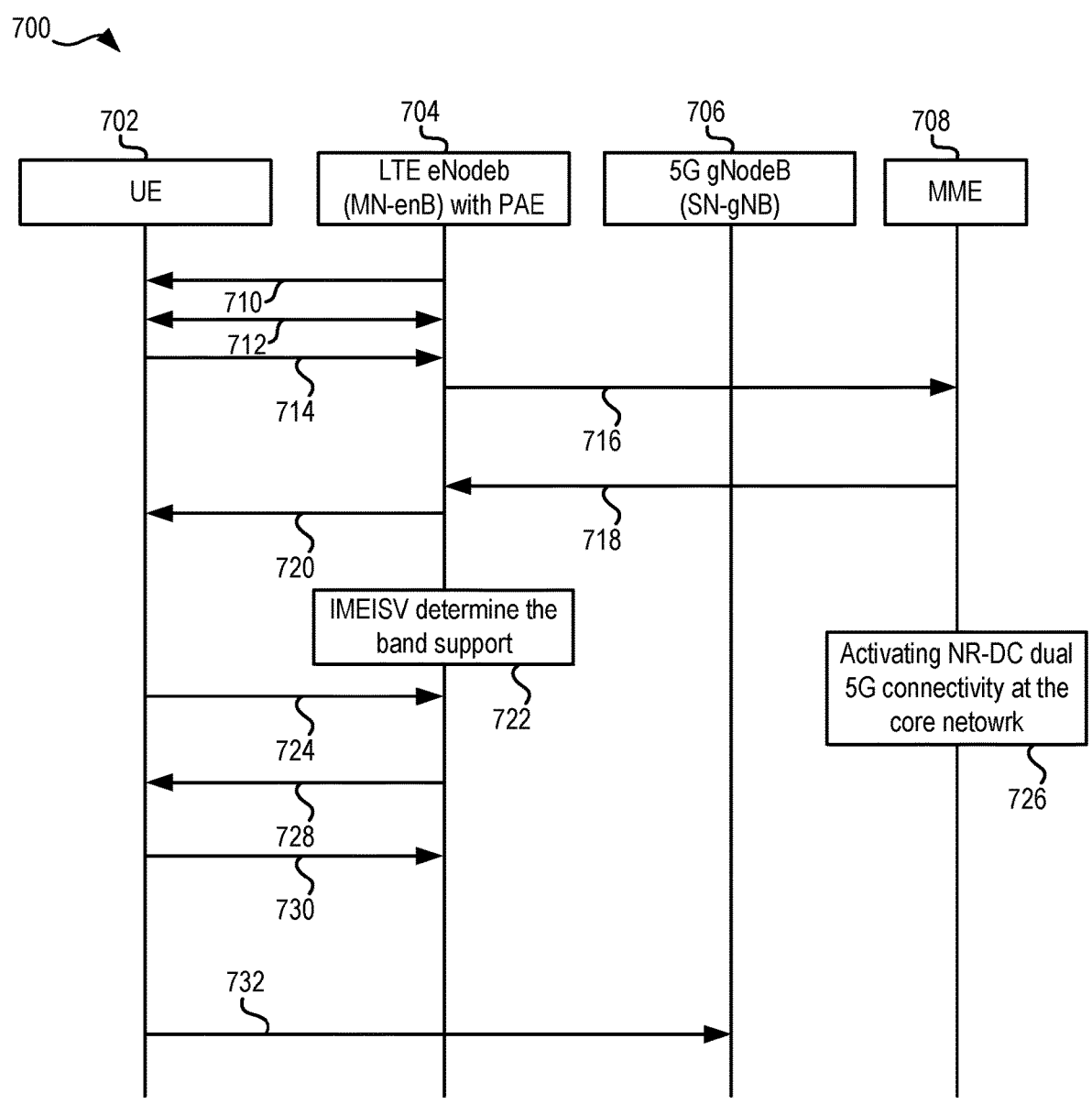
FIG. 7A is a flowchart of a method, in accordance with one embodiment of the present invention.

Now referring to FIG. 7A, a flowchart of a computer-implemented method 700 is shown according to one embodiment. The method 700 may be performed in accordance with the present invention in any of the environments depicted in FIGS. 1-8H, among others, in various embodiments. Of course, more or less operations than those specifically described in FIG. 7A may be included in method 700, as would be understood by one of skill in the art upon reading the present descriptions.

Each of the steps of the method 700 may be performed by any suitable component of the operating environment. For example, each of the nodes 702, 704, 706, 708 shown in the flowchart of method 700 may correspond to one or more processors positioned at a different location in a network environment. Moreover, each of the one or more processors are preferably configured to communicate with each other.

In various embodiments, the method 700 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 7A includes different nodes 702, 704, 706, 708, each of which represent one or more processors, controllers, computer, etc., positioned at a different location in a network environment. For instance, node 702 may include a first device, e.g., see UE. Node 704 may include a master node of an LTE base station, e.g., see LTE eNodeb (MN-enB) with PAE. Furthermore, node 706 may include a secondary node of a 5G base station, e.g., see 5G gNodeB (SN-gNB). Yet furthermore, node 708 may include a core network, e.g., see mobility management entity (MME). Accordingly, commands, data, requests, etc. may be sent between each of the nodes 702, 704, 706, 708 depending on the approach. Moreover, it should be noted that the various processes included in method 700 are in no way intended to be limiting, e.g., as would be appreciated by one skilled in the art after reading the present description. For instance, data sent from node 702 to node 704 may be prefaced by a request sent from node 704 to node 702 in some approaches.

In operation 710, a SIB2 is broadcasted from the node 704 to the node 702. In some approaches, the SIB2 broadcast from the MN-eNB signals the presence of 5G-NR PLMNs via the PLMN-InfoList-r15. Operation 712 includes performing a RACH process between the node 702 and the node 704.

In response to a determination that 5G PLMN information is available in the SIB2 broadcast, an RRC Connection request [NAS Attach Request UE network capability= (DCNR)] and IMEISV is sent to and received by the node 704, e.g., see operation 714. In some approaches, in response to a determination that 5G PLMN is present in the SIB2, the node 702 performs the RRC connection with the LTE leg as usual and in response to a determination that the first device, e.g., see node 702, also supports an NSA mode, an attach request is piggybacked towards the LTE leg. DCNR bit information and masked IMEISV information is preferably shared via an NAS signaling message that is forwarded towards the node 708.

It is determined, e.g., by a core network of node 708, whether the UE is authorized to connect to 4G and 5G networks in operations 716-718. For example, an initial context setup request, e.g., Attach Accept [Activate Default Bearer Request {APN-AMBR IE}], may be output from the node 708 to the node 704. In operation 720, the node 704 responds with an RRC Setup message on the DL-SCH, e.g., a RRC connection setup. In response to a determination that the node 704 already has the UE capabilities for the TAC code from the IMEISV, no UE capability request is sent to UE. This reduces an amount of processing that would otherwise be performed in capability request operations between the nodes 702, 704.

In operation 722 the NAS messages from the UE are signaled to the Core Network via the initial UE message, and the IMEISV may be used to determine the band support of the node 702. A confirmation message may be sent in operation 724 that confirms completion of the RRC connection setup. Furthermore, NR-DC Dual 5G connectivity may be activated at the core network in operation 726.

The masked IMEISV information which has the TAC information may be available in the enodeB repository, and therefore the device type related information may be fetched in an RRC connection reconfiguration operation 728. Accordingly, the LTE leg does not need to enquire UE capability request and/or UE capability enquiry of bands supported by the first device of node 702. This is because such information is identifiable from TAC code. With the UE capability and band supported identified the RRC reconfiguration message may be shared with a band combination for 5G to be searched and accessed to the UE. The UE may signal completion of the RRC connection reconfiguration in operation 730. In operation 732 the UE begins tuning to 5G NR.

Figure 7B:
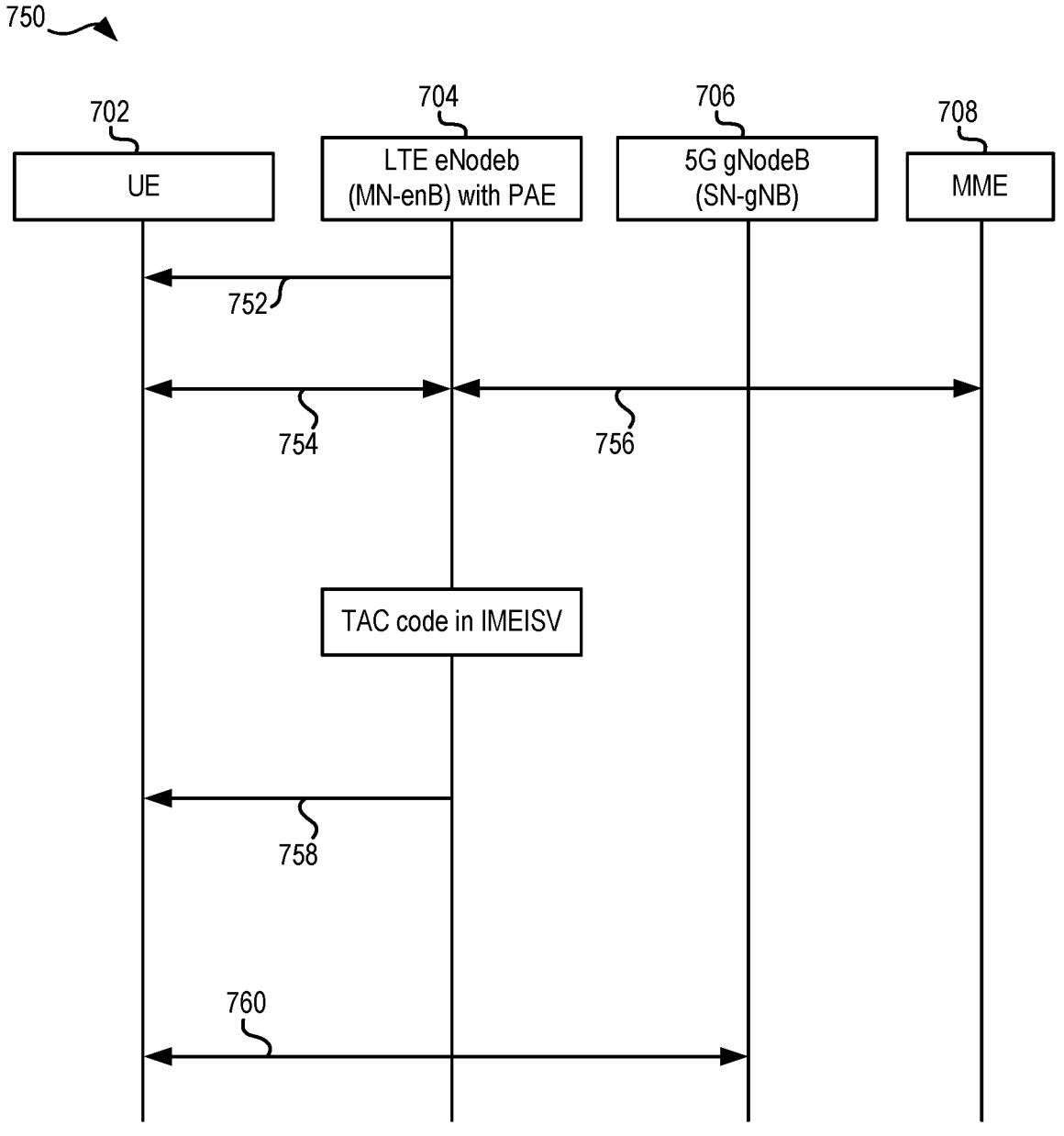
FIG. 7B is a relatively higher level version of the flowchart of FIG. 7A, in accordance with one embodiment of the present invention.

Now referring to FIG. 7B, a flowchart of a method 750 is shown according to one embodiment. The method 750 may be performed in accordance with the present invention in any of the environments depicted in FIGS. 1-8H, among others, in various embodiments. Of course, more or fewer operations than those specifically described in FIG. 7B may be included in method 750, as would be understood by one of skill in the art upon reading the present descriptions.

Each of the steps of the method 750 may be performed by any suitable component of the operating environment. For example, in various embodiments, the method 750 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 750. Illustrative processors include, but are not limited to, a central processing unit (CPU), an application specific integrated circuit (ASIC), a field programmable gate array (FPGA), etc., combinations thereof, or any other suitable computing device known in the art.

It should be noted that method 750 is a relatively higher level version of the flowchart of FIG. 7A, in that method 750 only includes four primary steps of operations performed between nodes 702, 704, 706, 708.

In a first step, an SIB2 broadcast and a RACH process is performed between node 702 and node 704, e.g., see operation 752. In a second step, an RRC setup is performed between node 702 and node 704, e.g., see operation 754. In operation 756 TAC code is attached in the IMEISV of a request output to a core network, e.g., bearer setup with the core network and NSA precheck is performed between the node 704 and the node 708. In operation 758, 5G configurations are established between the node 702 and the 704, and thereafter the UE may latch to the 5G leg, e.g., see operation 760.

Similar to various other techniques described herein, method 750 enables a relative reduction in access time by enabling parallel message flow and registration process. This is compared to otherwise having to perform UE capability band support operations. In other words, no new message is introduced to determine such capabilities. Over the air interface signaling is also reduced as a result of the enodeB repositories list.

FIGS. 8A-8H depict samples of information elements 800, 810, 820, 830, 840, 850, 860, and 870, in accordance with several embodiments. As an option, the information elements 800, 810, 820, 830, 840, 850, 860, and 870 may be implemented in conjunction with features from any other embodiment listed herein, such as those described with reference to the other FIGS. Of course, however, such information elements 800, 810, 820, 830, 840, 850, 860, and 870 and others presented herein may be used in various applications and/or in permutations which may or may not be specifically described in the illustrative embodiments listed herein. Further, the information elements 800, 810, 820, 830, 840, 850, 860, and 870 presented herein may be used in any desired environment.

Referring first to FIG. 8A, information element 800 is SIB2 information that notifies an end device whether a network supports a 5G public land mobile network (PLMN). It may be determined that 5G is supported in response to such PLMN information being attached to a request. In some approaches in which 5G PLMN is available in LTE SIB2, and an end device supports 5G bands, an attach request may be shared with a DCNR bit piggy backed with a RRC connection request.

With reference now to FIG. 8B, information elements 810 is generated in response to a determination that 5G is supported. In some approaches, a UE may share information piggybacked in a RRC connection request that it also supports Band NR so that enodeB can shares the information with a core network, e.g., MME. For example, in FIG. 8B, the piggybacked information is under header SupportedBandListNR-r15.

Referring now to FIG. 8C, in an attach request under UE network capability, enodeB will share the information to MME that DCNR is supported, e.g., see DCNR and IMEISV. IMEISV may be derived from the TAC, e.g., see information element 820. In some approaches, the TAC is the initial eight-digit portion of the 15-digit IMEI and 16-digit IMEISV codes used to uniquely identify wireless devices.

The information element 830 of FIG. 8D is preferably included in a message only if the network wishes to transmit the APN-AMBR values to the UE for possible uplink policy enforcement and at least one of the values to be transmitted exceeds the maximum value specified in the APN aggregate maximum bit rate information. Here MME will share 5G downlink and uplink data rates information elements towards the UE.

In FIGS. 8E-8F, in an RRC connection setup, a supported band list NR-r15 IE is piggybacked to request UE on the frequency combination support, e.g., see information elements 840-850.

In FIG. 8G, once the RRC connection setup is complete, a whole band list NR-r15 information element 860 may be piggybacked back to enodeB stating the different band combinations.

The information element 870 of FIG. 8H is not needed as a result of using the techniques described in various embodiments and approaches described herein. This is because the TAC code UE capability information is already in the LTE leg. Accordingly, separate operations that would otherwise be performed to obtain such information are avoided and processing performed in computer devices of a network environment is relatively reduced.

It should be noted that the techniques of various embodiments and approaches described herein reduce the access time and signaling load for user devices accessing a telecommunication signal network, e.g., 5G, in NSA mode. Furthermore, such embodiments and approaches enable a novel mechanism in which a UE is caused to proactively shares a 5G capability (DCNR bit) and masked IMEISV to a base station so that a 5G leg addition can be performed and a core network is updated immediately. This way a software version is provided to the base station in an initial RRC request. Upon receiving RRC request, the base station is caused to check with a programmable analytics layer regarding the 5G leg addition success rate on the particular carrier. Accordingly, the core network is immediately updated regarding the dual connectivity bearer setup procedure. A programmable analytics layer in proximity to a base station is also enabled for identifying the UE type and capabilities of the UE by storing historical data exchanged in a UE capability block. The UE capability block repository in programmable analytics layer may optionally be continuously updated and/or maintained upon identification of new IMEISV or software version in a RRC request. This removes a need of UE capability information messages. A base station may be instructed to leverage the UE capability block in the programmable analytics layer to share the measurement object towards the end device for 5G addition without the need of exchanging UE capability messages between the end device and the base station, thus leading to reduced handshaking between the end device and the base station. For example, signaling messages wherever applicable are also piggybacked which leads to a relatively lower signaling load, and minimal message payload increase, which results in relatively less handshaking between entities. A relatively efficient radio spectrum optimal utilization is also enabled by RRC message piggybacking and relatively lowering the handshaking message count.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
collecting, by a computer, device information from at least a first device;
causing, by the computer, a random access channel (RACH) process to be performed between the first device and a master node of a first base station;
receiving, subsequent to the RACH process being performed, by the computer from the first device, a first request to attach to the first base station;
in response to receiving the first request, determining, by the computer, whether a signal broadcasted from the first base station includes public land mobile network (PLMN) information of a first type of telecommunication signal;
in response to a determination that the signal broadcasted from the first base station includes the PLMN information, sending, by the computer to a core network, a second request to connect the first device to a node associated with the first type of telecommunication signal of the first base station, wherein the second request includes at least some of the device information; and
in response to receiving, from the core network, an indication that the first device is authorized for the connection to the node associated with the first type of telecommunication signal, allowing, by the computer, the connection to be established between the first device and the node associated with the first type of telecommunication signal.

2. The computer-implemented method of claim 1, wherein the device information includes system information block type 2 (SIB2).

3. The computer-implemented method of claim 1, wherein the second request includes Dual-Connectivity with New Radio (DCNR) bit information, wherein the DCNR bit information includes a DCNR restricted status.

4. The computer-implemented method of claim 1, wherein the first request is received while the first device is connected to a node associated with a second type of telecommunication signal of a second base station, wherein the first request is made in response to a determination that the first device has exited a first predetermined geographical proximity of the second base station and entered into a second predetermined geographical proximity of the first base station, wherein upon entering into the second predetermined geographical proximity of the first base station, the signal broadcasted from the first base station is relatively stronger and superior in signal quality than the second type of telecommunication signal of the second base station.

5. The computer-implemented method of claim 4, wherein the first type of telecommunication signal is fifth-generation wireless (5G), wherein the second type of telecommunication signal is Long-Term Evolution (LTE).

6. The computer-implemented method of claim 5, wherein the first base station transmits a third type of telecommunication signal, wherein the third type of telecommunication signal is LTE.

7. The computer-implemented method of claim 1, wherein the second request includes masked international mobile station equipment identity software version (IMEISV) information, wherein the IMEISV information comprises code that identifies a version of software that the first device is running.

8. The computer-implemented method of claim 1, wherein the indication is not determined based on a capability enquiry from the first base station to the first device, wherein the indication is not determined based on an answer to the capability enquiry.

9. The computer-implemented method of claim 1, wherein the second request is sent via a non-access stratum (NAS) signaling message from the master node of the first base station to the core network.

10. The computer-implemented method of claim 1, wherein allowing the connection to be established between the first device and the node associated with the first type of telecommunication signal includes: instructing the first device to tune to the first type of telecommunication signal.

11. The computer-implemented method of claim 1, comprising: in response to a determination that the signal broadcasted from the first base station does not include the PLMN information, allowing, by the computer, a connection to be established between the first device and a node associated with a second type of telecommunication signal of the first base station.

12. A computer program product, the computer program product comprising a non-transitory computer readable storage medium having program instructions embodied therewith, the program instructions readable and/or executable by a computer to cause the computer to:

collect, by the computer, device information from at least a first device;

cause, by the computer, a random access channel (RACH) process to be performed between the first device and a master node of a first base station;

receive, subsequent to the RACH process being performed, by the computer, from the first device, a first request to attach to the first base station;

in response to receiving the first request, determine, by the computer, whether a signal broadcasted from the first base station includes public land mobile network (PLMN) information of a first type of telecommunication signal;

in response to a determination that the signal broadcasted from the first base station includes the PLMN information, send, by the computer, to a core network, a second request to connect the first device to a node associated with the first type of telecommunication signal of the first base station, wherein the second request includes at least some of the device information; and in response to receiving, from the core network, an indication that the first device is authorized for the connection to the node associated with the first type of telecommunication signal, allow, by the computer, the connection to be established between the first device and the node associated with the first type of telecommunication signal.

13. The computer program product of claim 12, wherein the device information includes system information block type 2 (SIB2).

14. The computer program product of claim 12, wherein the second request includes Dual-Connectivity with New Radio (DCNR) bit information, wherein the DCNR bit information includes a DCNR restricted status.

15. The computer program product of claim 12, wherein the first request is received while the first device is connected to a node associated with a second type of telecommunication signal of a second base station, wherein the first request is made in response to a determination that the first device has exited a first predetermined geographical proximity of the second base station and entered into a second predetermined geographical proximity of the first base station, wherein upon entering into the second predetermined geographical proximity of the first base station, the signal broadcasted from the first base station is relatively stronger and superior in signal quality than the second type of telecommunication signal of the second base station.

16. The computer program product of claim 12, wherein the second request includes masked international mobile station equipment identity (IMEI) and software version information.

17. The computer program product of claim 12, wherein the indication is not determined based on a capability enquiry from the first base station to the first device, wherein the indication is not determined based on an answer to the capability enquiry.

18. The computer program product of claim 12, wherein the second request is sent via a non-access stratum (NAS) signaling message from the master node of the first base station to the core network.

19. The computer program product of claim 12, wherein allowing the connection to be established between the first device and the node associated with the first type of telecommunication signal includes: instructing the first device to tune to the first type of telecommunication signal.

20. A system, comprising:

a processor; and logic integrated with the processor, executable by the processor, or integrated with and executable by the processor, the logic being configured to:

collect device information from at least a first device;

cause a random access channel (RACH) process to be performed between the first device and a master node of a first base station;

receive, subsequent to the RACH process being performed, from the first device, a first request to attach to the first base station;

in response to receiving the first request, determine whether a signal broadcasted from the first base station includes public land mobile network (PLMN) information of a first type of telecommunication signal;

in response to a determination that the signal broadcasted from the first base station includes the PLMN information, send, to a core network, a second request to connect the first device to a node associated with the first type of telecommunication signal of the first base station, wherein the second request includes at least some of the device information; and in response to receiving, from the core network, an indication that the first device is authorized for the connection to the node associated with the first type of telecommunication signal, allow the connection to be established between the first device and the node associated with the first type of telecommunication signal.

* * * * *